(12) United States Patent
Inagaki et al.

(10) Patent No.: US 11,396,033 B2
(45) Date of Patent: Jul. 26, 2022

(54) SEPARATION DEVICE

(71) Applicant: SEIKO EPSON CORPORATION, Tokyo (JP)

(72) Inventors: Yuta Inagaki, Nagano (JP); Naoko Omagari, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 25 days.

(21) Appl. No.: 16/775,392

(22) Filed: Jan. 29, 2020

(65) Prior Publication Data

US 2020/0246836 A1    Aug. 6, 2020

(30) Foreign Application Priority Data

Jan. 31, 2019  (JP) .............................. JP2019-015325

(51) Int. Cl.
*B07B 13/18* (2006.01)
*D01G 9/08* (2006.01)
(Continued)

(52) U.S. Cl.
CPC ................. *B07B 4/08* (2013.01); *B29B 7/90* (2013.01); *B29B 13/10* (2013.01); *B02C 23/10* (2013.01);
(Continued)

(58) Field of Classification Search
CPC .. B07B 4/08; B29B 7/90; B29B 13/10; B02C 23/10
(Continued)

(56) References Cited

U.S. PATENT DOCUMENTS 2,265,977 A    12/1941  Andrews
3,123,551 A     3/1964  Walker
(Continued)

FOREIGN PATENT DOCUMENTS

DE         964463 C    5/1957
DE       2459537 C2    8/1983
(Continued)

OTHER PUBLICATIONS

Mizui; Katsuya, "Powder Separator" (English Translation), Apr. 25, 1995, worldwide.espacenet.com (Year: 1995).*
(Continued)

*Primary Examiner* — Michael McCullough
*Assistant Examiner* — Molly K Devine
(74) *Attorney, Agent, or Firm* — Global IP Counselors, LLP

(57) ABSTRACT

A separation device includes a separation unit that has a first ejection unit having a first ejection port for depositing a material containing a fiber on a first surface, and a first suction unit having a first suction port for sucking from the first surface toward a second surface so that at least a part thereof overlaps the first ejection port, a second suction unit provided at a position different from the first ejection port and having a second suction port for sucking from the second surface toward the first surface, a detection unit that detects information on foreign matter contained in the material ejected from the first ejection port, an input unit that inputs a detection result of the detection unit, and a control unit that controls a separation condition in the separation unit based on the information input to the input unit.

5 Claims, 7 Drawing Sheets

(51) Int. Cl.

| | | |
|---|---|---|
| *D01G 5/00* | (2006.01) | |
| *D01G 9/14* | (2006.01) | |
| *D01G 11/04* | (2006.01) | |
| *D01G 13/00* | (2006.01) | |
| *D04H 1/44* | (2006.01) | |
| *D04H 1/587* | (2012.01) | |
| *D04H 1/732* | (2012.01) | |
| *D06B 1/02* | (2006.01) | |
| *B07B 4/08* | (2006.01) | |
| *B29B 7/90* | (2006.01) | |
| *B29B 13/10* | (2006.01) | |
| *B02C 23/10* | (2006.01) | |
| *B07B 1/06* | (2006.01) | |
| *B07B 1/08* | (2006.01) | |
| *B07B 7/06* | (2006.01) | |

(52) U.S. Cl.
CPC . *B07B 1/06* (2013.01); *B07B 1/08* (2013.01); *B07B 7/06* (2013.01)

(58) Field of Classification Search
USPC .......................................................... 209/240
See application file for complete search history.

(56) References Cited

U.S. PATENT DOCUMENTS

| | | |
|---|---|---|
| 3,367,502 A | 2/1968 | Cravens |
| 3,989,620 A | 11/1976 | Stern et al. |
| 4,213,855 A | 7/1980 | Von Bennigsen-Mackiewicz et al. |
| 4,485,009 A | 11/1984 | Csontos et al. |
| 4,678,560 A | 7/1987 | Stole et al. |
| 4,961,722 A | 10/1990 | Taylor et al. |
| 5,375,720 A | 12/1994 | Piggott et al. |
| 9,776,213 B2 | 10/2017 | Miyazawa |
| 9,856,104 B2 | 1/2018 | Fujita et al. |
| 2010/0243538 A1 | 9/2010 | Uebayashi et al. |
| 2015/0284672 A1 | 10/2015 | Swanda et al. |

FOREIGN PATENT DOCUMENTS

| | | | |
|---|---|---|---|
| DE | 10200842 | * 8/2002 | ............... B07B 1/15 |
| DE | 102012024266 A1 | 6/2014 | |
| EP | 2784210 A1 | 10/2014 | |
| JP | 07-108224 A | 4/1995 | |
| JP | H10-099785 A | 4/1998 | |
| JP | 2015-178206 A | 10/2015 | |
| JP | 2016-098473 A | 5/2016 | |
| JP | 2016-124211 A | 7/2016 | |

OTHER PUBLICATIONS

Steinacker; Klaus, "Waste Paper Sorted Into Different Classes by Graded Release from Air-Permeable Conveyor Belt Running Around Suction Chamber" (English Translation), Aug. 1, 2002, worldwide.espacenet.com (Year: 2002).*

* cited by examiner

SEPARATION DEVICE

The present application is based on, and claims priority from JP Application Serial Number 2019-015325, filed Jan. 31, 2019, the disclosure of which is hereby incorporated by reference herein in its entirety.

BACKGROUND

1. Technical Field

The present disclosure relates to a separation device.

2. Related Art

In the related art, a removal device that removes foreign matter and the like in supplied material is known (see, for example, JP-A-7-108224).

As shown in FIG. 1 of JP-A-7-108224, a separation device includes a disc-shaped screen 1, an ejection port 2 provided on one surface side of the screen 1, a suction port 3 provided on the opposite side of the ejection port 2 via the screen 1, an ejection port 4 provided on the other surface side of the screen 1 and at a position different from the suction port 3, and a suction port 5 provided on the opposite side of the ejection port 4 via the screen 1.

By supplying granular material from the ejection port 2 onto the screen 1 and performing suction from the suction port 3, excessively fine granular material can be removed. In this case, foreign matter in the granular material can also be removed. Further, when the screen 1 rotates, the granular material remaining on the screen 1 also moves, and at the destination, the granular material is separated from the screen 1 by air ejected from the ejection port 4, and the separated granular material can be collected by suction at the suction port 5.

However, in the separation device disclosed in JP-A-7-108224, research on the operating conditions of the ejection port 2, the suction port 3, the ejection port 4, and the suction port 5 has not been sufficiently conducted. For example, when there is a large amount of foreign matter in the granular material, the foreign matter cannot be sufficiently removed, and the amount of foreign matter remaining in the material collected at the suction port 5 may not be adjusted.

SUMMARY

The present disclosure can be realized in the following aspect.

According to an aspect of the present disclosure, there is provided a separation device. The separation device includes a mesh that has a first surface and a second surface in a front and back relationship, a separation unit that has a first ejection unit having a first ejection port for depositing a material containing a fiber on the first surface, and a first suction unit having a first suction port for sucking from the first surface toward the second surface so that at least a part thereof overlaps the first ejection port in plan view, a second suction unit provided at a position different from the first ejection port in plan view and having a second suction port for sucking from the second surface toward the first surface, a detection unit that detects information on foreign matter contained in the material ejected from the first ejection port, an input unit that inputs a detection result of the detection unit, and a control unit that controls a separation condition in the separation unit based on the information input to the input unit.

DESCRIPTION OF EXEMPLARY EMBODIMENTS

Hereinafter, a separation device according to the present disclosure will be described in detail with reference to a preferred embodiment shown in the accompanying drawings.

First Embodiment

Figure 1:
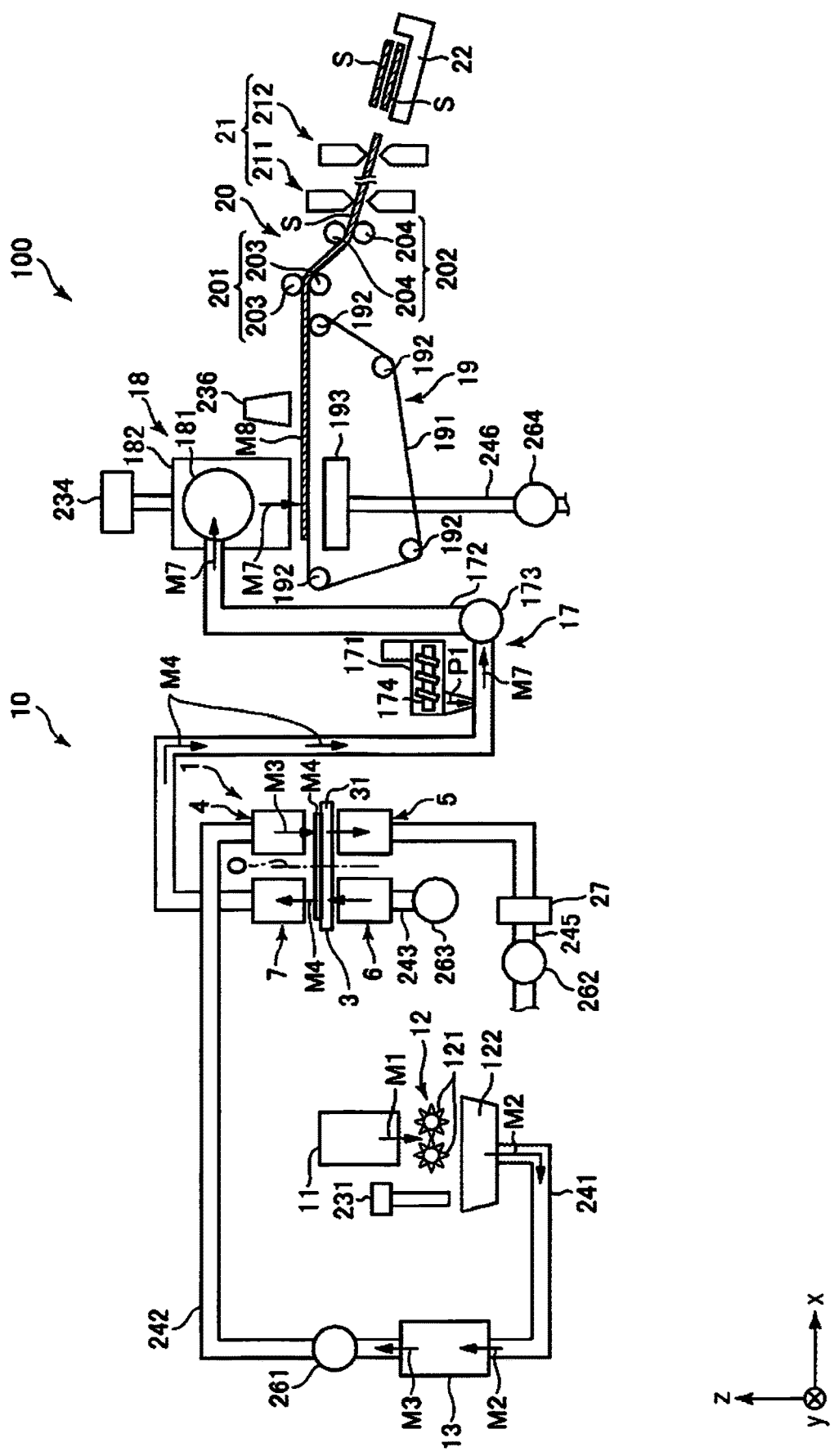
FIG. 1 is a schematic side view showing a sheet manufacturing apparatus including a separation device according to a first embodiment of the present disclosure.
Figure 2:
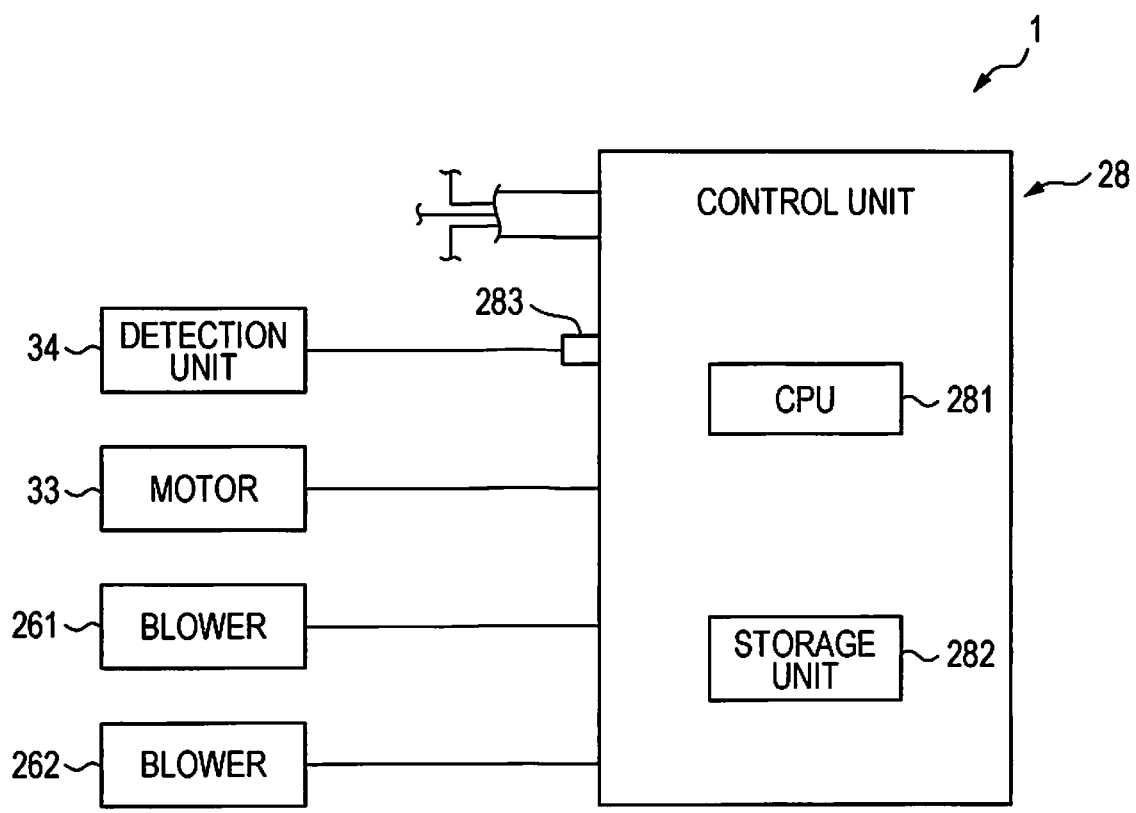
FIG. 2 is a block diagram of the sheet manufacturing apparatus shown in FIG. 1.
Figure 3:
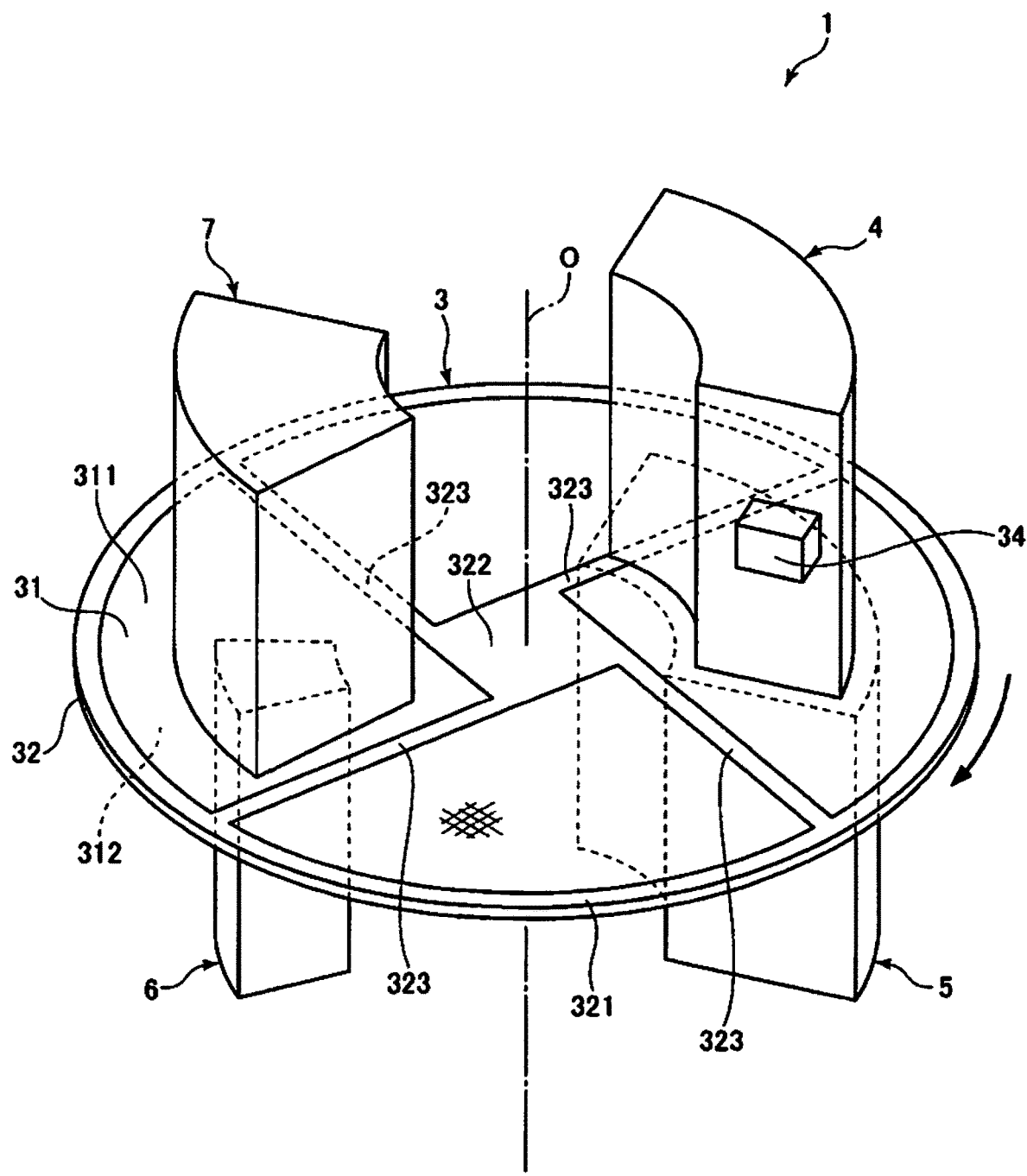
FIG. 3 is a perspective view of the separation device shown in FIG. 1.
Figure 4:
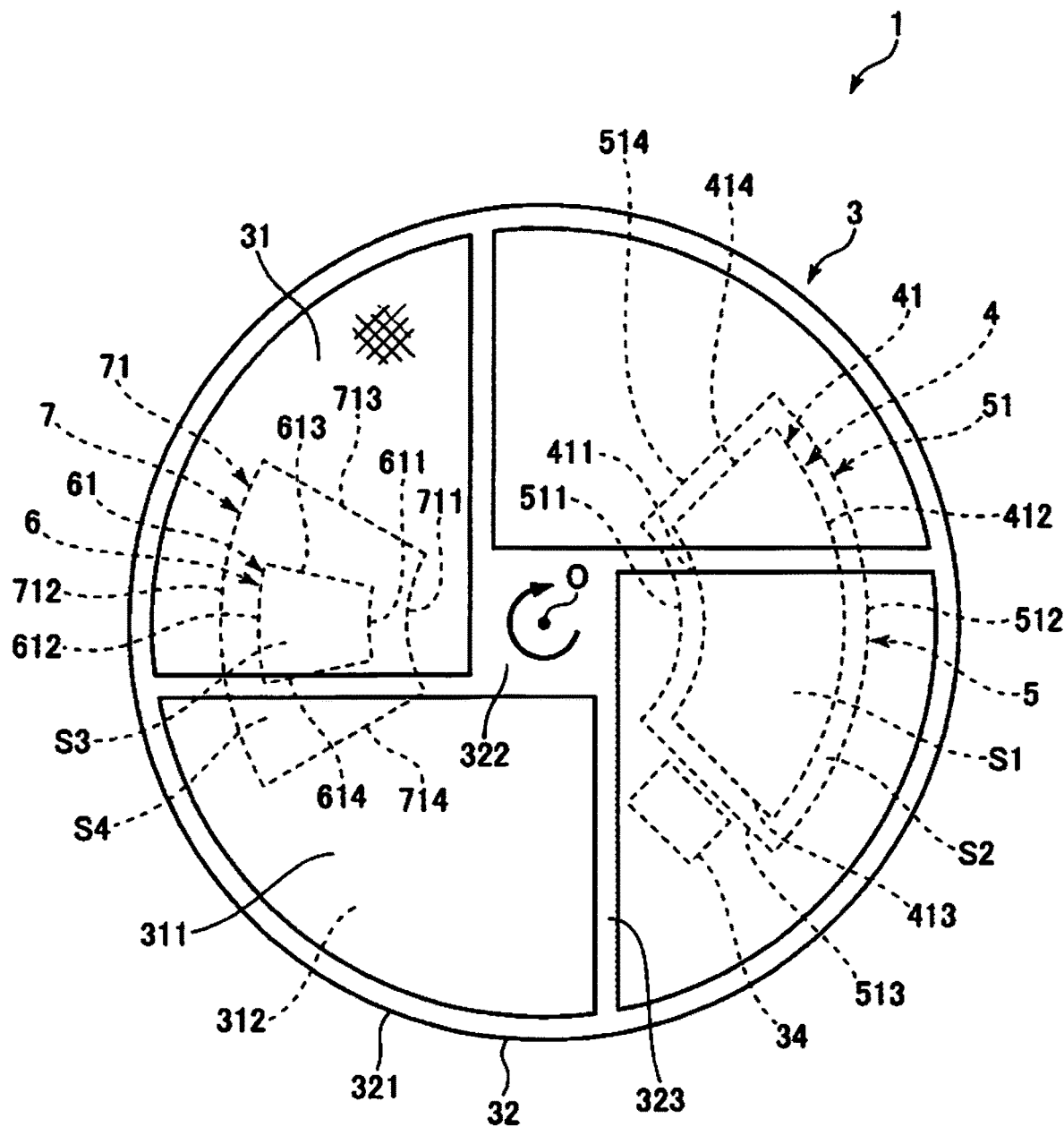
FIG. 4 is a plan view of the separation device shown in FIG. 3.
Figure 5:
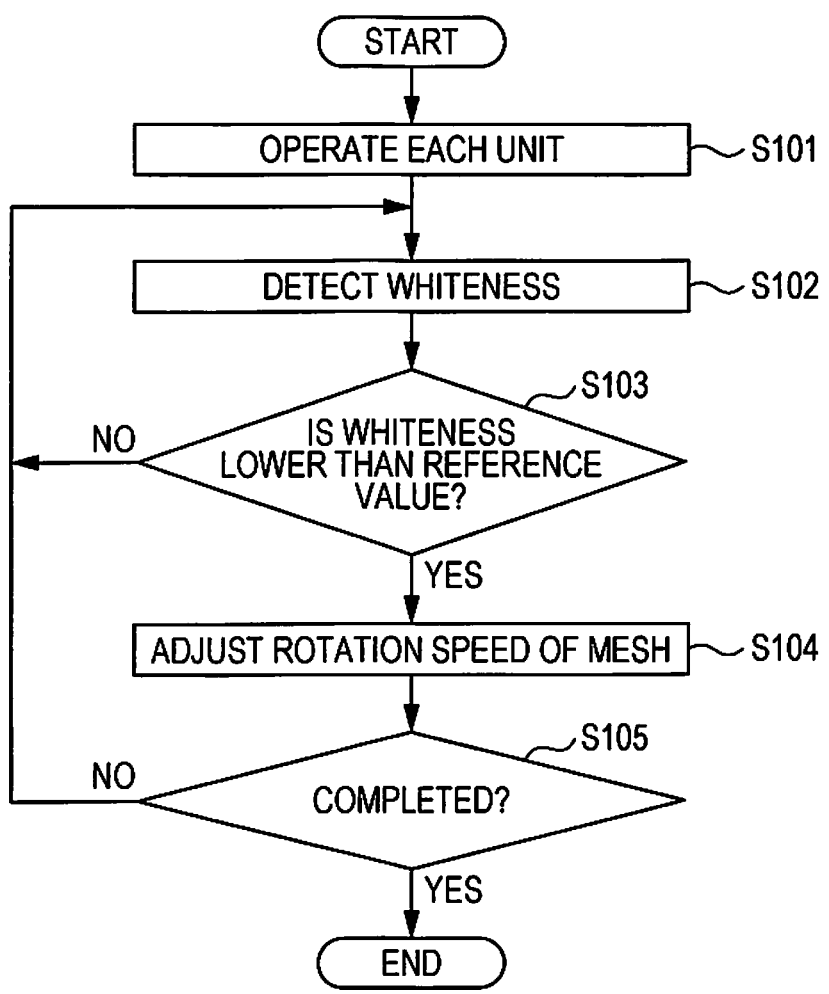
FIG. 5 is a flowchart for describing a control operation performed by a control unit shown in FIG. 2.
Figure 6:
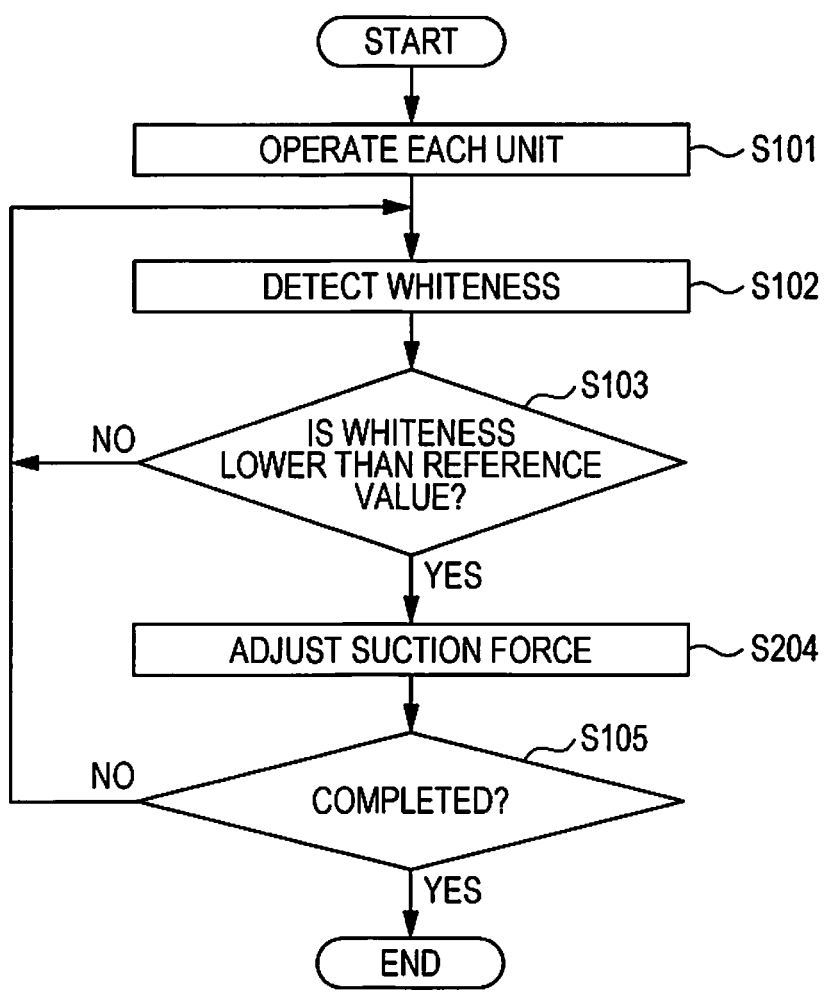
FIG. 6 is a flowchart for describing a control operation performed by the control unit shown in FIG. 2.
Figure 7:
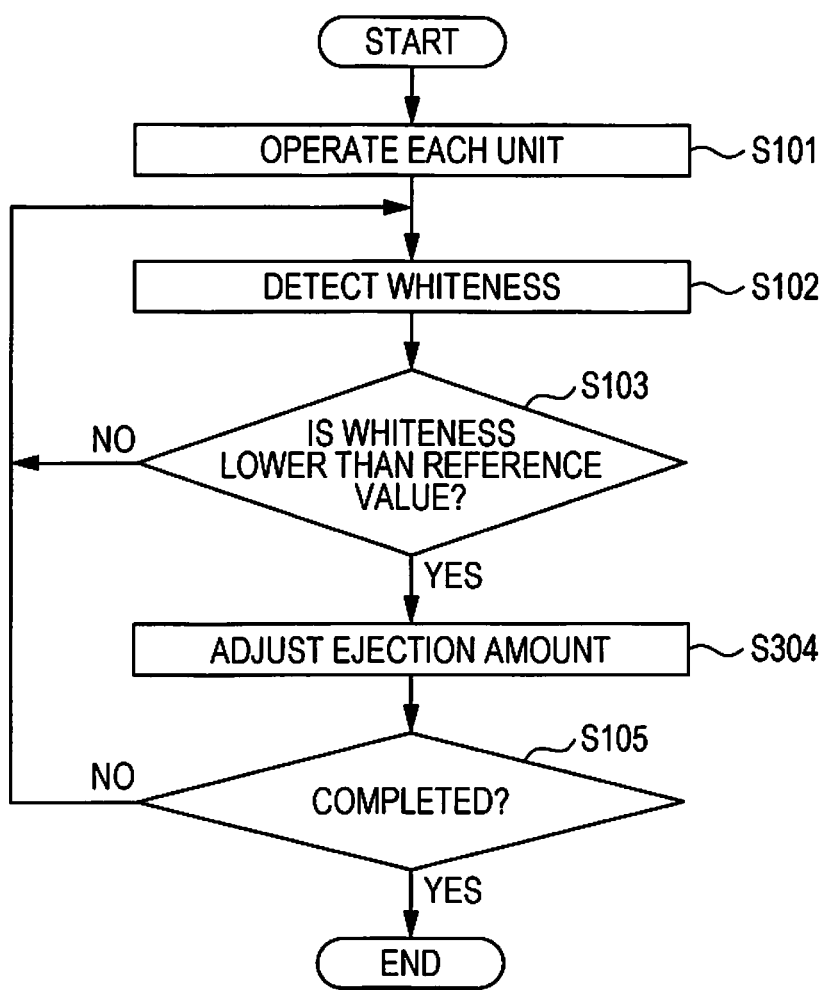
FIG. 7 is a flowchart for describing a control operation performed by the control unit shown in FIG. 2.

FIG. 1 is a schematic side view showing a sheet manufacturing apparatus including a separation device according to a first embodiment of the present disclosure. FIG. 2 is a block diagram of the sheet manufacturing apparatus shown in FIG. 1. FIG. 3 is a perspective view of the separation device shown in FIG. 1. FIG. 4 is a plan view of the separation device shown in FIG. 3. FIGS. 5 to 7 are flowcharts for describing control operations performed by a control unit shown in FIG. 2.

In the following, for convenience of description, as shown in FIG. 1, three axes orthogonal to each other are referred to as an x-axis, a y-axis, and a z-axis. Further, an xy plane including the x axis and the y axis is horizontal, and the z axis is vertical. The direction in which the arrow of each axis is directed is referred to as "+", and the opposite direction is referred to as "−". In FIGS. 1 and 3, an upper side may be referred to as "up" or "above", and a lower side may be referred to as "down" or "below".

As shown in FIG. 1, a sheet manufacturing apparatus 100 includes a raw material supply unit 11, a crushing unit 12, a defibrating unit 13, a separation device 1 according to the present disclosure, a mixing unit 17, a loosening unit 18, a web forming unit 19, a sheet forming unit 20, a cutting unit 21, a stock unit 22, and a collection unit 27. Further, the separation device 1 has a control unit 28, and each of the units is electrically coupled to the control unit 28, and the operation thereof is controlled by the control unit 28. In the present embodiment, the control unit 28 included in the separation device 1 is configured to control each unit of the sheet manufacturing apparatus 100. However, the present disclosure is not limited thereto, and a control unit that controls a part other than the separation device 1 may be separately provided in the sheet manufacturing apparatus 100.

Further, the sheet manufacturing apparatus 100 includes a humidifying unit 231, a humidifying unit 234, and a humidifying unit 236. In addition, the sheet manufacturing apparatus 100 includes a blower 261, a blower 262, a blower 263, and a blower 264. The blower 261, the blower 262, the blower 263, and the blower 264 can change the air volume by changing energization conditions.

Further, in the sheet manufacturing apparatus 100, a raw material supply process, a crushing process, a defibration process, a separation process, a mixing process, a loosening process, a web forming process, a sheet forming process, and a cutting process are executed in this order.

Hereinafter, the configuration of each unit will be described.

The raw material supply unit 11 performs the raw material supply process which supplies a raw material M1 to the crushing unit 12. The raw material M1 is a sheet-like material which consists of a fiber-containing material containing a cellulose fiber. The cellulose fiber is not particularly limited as long as it is mainly composed of cellulose as a compound and has a fibrous shape, and the fiber may contain hemicellulose and lignin in addition to cellulose. Further, the raw material M1 may be in any form such as woven fabric or non-woven fabric. The raw material M1 may be, for example, recycled paper that is recycled and manufactured by defibrating used paper or YUPO paper (registered trademark) that is synthetic paper, or may not be recycled paper. In the present embodiment, the raw material M1 is used paper that has been used or that is no longer needed.

The crushing unit 12 performs a crushing process of crushing the raw material M1 supplied from the raw material supply unit 11 in the atmosphere or the like. The crushing unit 12 has a pair of crushing blades 121 and a chute 122.

The pair of crushing blades 121 can rotate in mutually opposite directions to crush the raw material M1 between the crushing blades, that is, cut the raw material to form a crushing piece M2. The shape and size of the crushing piece M2 may be suitable for a defibrating process in the defibrating unit 13, are preferably a small piece having a side length of 100 mm or less, and more preferably a small piece having a side length of 10 mm or more and 70 mm or less, for example.

The chute 122 is disposed below the pair of crushing blades 121 and has, for example, a funnel shape. Thereby, the chute 122 can receive the crushing piece M2 which is crushed by the crushing blade 121 and fell.

Further, the humidifying unit 231 is disposed above the chute 122 so as to be adjacent to the pair of crushing blades 121. The humidifying unit 231 humidifies the crushing piece M2 in the chute 122. The humidifying unit 231 has a filter (not shown) containing moisture, and includes a vaporization type or hot air vaporization type humidifier that supplies humidified air with increased humidity to the crushing piece M2 by passing air through the filter. By supplying the humidified air to the crushing piece M2, it is possible to prevent the crushing piece M2 from adhering to the chute 122 and the like due to static electricity.

The chute 122 is coupled to the defibrating unit 13 via a pipe 241. The crushing piece M2 collected on the chute 122 passes through the pipe 241 and is transported to the defibrating unit 13.

The defibrating unit 13 performs a defibrating process of defibrating the crushing piece M2 in the air, that is, in a dry manner. By the defibrating process in the defibrating unit 13, a defibrated material M3 can be generated from the crushing piece M2. Here, "defibrating" means unraveling the crushing piece M2 formed by binding a plurality of fibers into individual fibers. Then, the unraveled material is the defibrated material M3. The shape of the defibrated material M3 is linear or band shape. Further, the defibrated material M3 may exist in a state where the defibrated material is entangled and formed into a lump, that is, in a state of forming a so-called "ball".

In the present embodiment, for example, the defibrating unit 13 includes an impeller mill having a rotor that rotates at a high speed and a liner that is positioned on the outer periphery of the rotor. The crushing piece M2 flowing into the defibrating unit 13 is defibrated by being sandwiched between the rotor and the liner.

Further, the defibrating unit 13 can generate a flow of air from the crushing unit 12 toward the separation device 1, that is, an air flow, by rotation of the rotor. Thereby, it is possible to suck the crushing piece M2 to the defibrating unit 13 from the pipe 241. After the defibrating process, the defibrated material M3 can be sent out to the separation device 1 via the pipe 242.

The blower 261 is installed in the middle of the pipe 242. The blower 261 is an air flow generation device that generates an air flow toward the separation device 1. Thereby, sending out the defibrated material M3 to the separation device 1 is promoted.

The separation device 1 is a device that performs a separation process of selecting the defibrated material M3 based on the length of the fiber and removing foreign matter in the defibrated material M3. The configuration of the separation device 1 will be described in detail later. The defibrated material M3 becomes a defibrated material M4 from which foreign matter such as coloring material is removed by passing through the separation device 1, and which includes fibers having a length equal to or longer than a predetermined length, that is, fibers having a length suitable for sheet manufacturing. The defibrated material M4 is sent out to the mixing unit 17 on the downstream.

The mixing unit 17 is disposed downstream of the separation device 1. The mixing unit 17 performs the mixing process which mixes the defibrated material M4 and a resin P1. The mixing unit 17 has a resin supply unit 171, a pipe 172, and a blower 173.

The pipe 172 couples a second suction unit 7 of the separation device 1 and a housing unit 182 of the loosening unit 18 to each other and is a flow path through which a mixture M7 of the defibrated material M4 and the resin P1 passes.

The resin supply unit 171 is coupled in the middle of the pipe 172. The resin supply unit 171 has a screw feeder 174. When the screw feeder 174 is rotationally driven, the resin P1 can be supplied to the pipe 172 as powder or particles. The resin P1 supplied to the pipe 172 is mixed with the defibrated material M4 to become the mixture M7.

The resin P1 is obtained by binding the fibers in a later process, and for example, a thermoplastic resin, a curable resin, or the like can be used, but a thermoplastic resin is preferably used. Examples of the thermoplastic resin include an AS resin, an ABS resin, polyethylene, polypropylene, polyolefin such as an ethylene-vinyl acetate copolymer (EVA), modified polyolefin, an acrylic resin such as polymethyl methacrylate, polyvinyl chloride, polystyrene, polyester such as polyethylene terephthalate and polybutylene terephthalate, polyamide (nylon) such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyetheretherketone, polycarbonate, polyphenylene sulfide, thermoplastic polyimide, polyetherimide, a liquid crystal polymer such as aromatic polyester, various thermoplastic elastomers such as a styrene-based thermoplastic elastomer, a polyolefin-based thermoplastic elastomer, a polyvinyl chloride-based thermoplastic elastomer, a polyurethane-based thermoplastic elastomer, a polyester-based thermoplastic elastomer, a polyamide-based thermoplastic elastomer, a polybutadiene-based thermoplastic elastomer, a trans polyisoprene-based thermoplastic elastomer, a fluoro rubber-based thermoplastic elastomer, and a chlorinated polyethylene-based thermoplastic elastomer, and the like, and one or more selected from these can be used in combination. Preferably, as the thermoplastic resin, polyester or a composition containing the polyester is used.

In addition to the resin P1, a colorant for coloring the fiber, an aggregation inhibitor for inhibiting aggregation of the fiber or aggregation of the resin P1, a flame retardant for making the fiber difficult to burn, a paper strengthening agent for enhancing the paper strength of sheet S, and the like may be supplied from the resin supply unit 171. Alternatively, the above-mentioned colorant, aggregation inhibitor, flame retardant, and paper strengthening agent are contained and compounded in the resin P1 in advance, and then the resultant may be supplied from the resin supply unit 171.

In the middle of the pipe 172, the blower 173 is installed downstream of the resin supply unit 171. The defibrated material M4 and the resin P1 are mixed by the action of a rotating portion such as a blade of the blower 173. Further, the blower 173 can generate an air flow toward the loosening unit 18. With the air flow, the defibrated material M4 and the resin P1 can be stirred in the pipe 172. Thereby, the mixture M7 can flow into the loosening unit 18 in a state where the defibrated material M4 and the resin P1 are uniformly dispersed. Further, the defibrated material M4 in the mixture M7 is loosened in the process of passing through the pipe 172, and has a finer fibrous shape.

The loosening unit 18 performs the loosening process of loosening the mutually entangled fibers in the mixture M7. The loosening unit 18 includes a drum unit 181 and the housing unit 182 that houses the drum unit 181.

The drum unit 181 is a sieve that is formed of a cylindrical net body and that rotates around its central axis. The mixture M7 flows into the drum unit 181. When the drum unit 181 rotates, fibers or the like smaller than the opening of the net in the mixture M7 can pass through the drum unit 181. At that time, the mixture M7 is loosened.

The housing unit 182 is coupled to the humidifying unit 234. The humidifying unit 234 includes a vaporization type humidifier similar to the humidifying unit 231. Thereby, the humidified air is supplied into the housing unit 182. The inside of the housing unit 182 can be humidified with the humidified air, so that the mixture M7 can be prevented from adhering to the inner wall of the housing unit 182 by electrostatic force.

Further, the mixture M7 loosened in the drum unit 181 falls while being dispersed in the air, and travels to the web forming unit 19 located below the drum unit 181. The web forming unit 19 performs the web forming process of forming a web M8 from the mixture M7. The web forming unit 19 has a mesh belt 191, a tension roller 192, and a suction unit 193.

The mesh belt 191 is an endless belt, and the mixture M7 is deposited thereon. The mesh belt 191 is wound around four tension rollers 192. When the tension rollers 192 are rotationally driven, the mixture M7 on the mesh belt 191 is transported toward downstream.

Further, most of the mixture M7 on the mesh belt 191 has a size equal to or larger than the opening of the mesh belt 191. Thereby, the mixture M7 is restricted from passing through the mesh belt 191 and can thus be deposited on the mesh belt 191. Since the mixture M7 is transported toward downstream with the mesh belt 191 in a state where the mixture is deposited on the mesh belt 191, the mixture is formed as the layered web M8.

The suction unit 193 is a suction mechanism that sucks air from below the mesh belt 191. Thereby, the mixture M7 can be sucked onto the mesh belt 191, and thus the deposition of the mixture M7 onto the mesh belt 191 is promoted.

A pipe 246 is coupled to the suction unit 193. Further, the blower 264 is installed in the middle of the pipe 246. By the operation of the blower 264, a suction force can be generated at the suction unit 193.

The humidifying unit 236 is disposed downstream of the loosening unit 18. The humidifying unit 236 includes an ultrasonic humidifier. Thereby, moisture can be supplied to the web M8, and thus the content of moisture of the web M8 is adjusted. By the adjustment, adsorption of the web M8 to the mesh belt 191 due to electrostatic force can be suppressed. Thereby, the web M8 is easily peeled from the mesh belt 191 at a position where the mesh belt 191 is folded back by the tension roller 192.

The total content of moisture added from the humidifying unit 231 to the humidifying unit 236 is preferably 0.5 parts by mass or more and 20 parts by mass or less with respect to 100 parts by mass of the material before humidification, for example.

The sheet forming unit 20 is disposed downstream of the web forming unit 19. The sheet forming unit 20 performs the sheet forming process of forming the sheet S from the web M8. The sheet forming unit 20 has a pressurizing unit 201 and a heating unit 202.

The pressurizing unit 201 has a pair of calender rollers 203 and can pressurize the web M8 between the calender rollers 203 without heating the web M8. Thereby, the density of the web M8 is increased. As an extent of the heating in this case, for example, it is preferable that the resin P1 is not melted. The web M8 is transported toward the heating unit 202. Note that, one of the pair of calender rollers 203 is a main driving roller which is driven by the operation of a motor (not shown), and the other is a driven roller.

The heating unit 202 has a pair of heating rollers 204 and can pressurize the web M8 between the heating rollers 204 while heating the web M8. By the heat and pressure, the resin P1 is melted in the web M8, and the fibers are bound to each other via the melted resin P1. Thereby, the sheet S is formed. The sheet S is transported toward the cutting unit 21. Note that, one of the pair of heating rollers 204 is a main driving roller which is driven by the operation of the motor (not shown), and the other is a driven roller.

The cutting unit 21 is disposed downstream of the sheet forming unit 20. The cutting unit 21 performs the cutting process of cutting the sheet S. The cutting unit 21 has a first cutter 211 and a second cutter 212.

The first cutter 211 cuts the sheet S in a direction that intersects with the transport direction of the sheet S, particularly in a direction orthogonal thereto.

The second cutter 212 cuts the sheet S in a direction parallel to the transport direction of the sheet S on the downstream of the first cutter 211. The cutting is a process of removing unnecessary portions at both ends of the sheet S, that is, the ends in the +y axis direction and the −y axis direction to adjust the width of the sheet S. In addition, the portion that has been removed by the cutting is referred to as a so-called "edge".

By cutting the first cutter 211 and the second cutter 212 as described above, the sheet S having a desired shape and size can be obtained. The sheet S is transported further downstream and accumulated in the stock unit 22.

Next, the separation device 1 will be described.

As shown in FIGS. 1 to 3, the separation device 1 includes a rotating member 3 having a mesh 31, a first ejection unit 4 that is a supply unit that ejects and supplies the defibrated material M3 with air onto the mesh 31, a first suction unit 5 that sucks a part of the defibrated material M3 on the mesh 31, a second ejection unit 6 that ejects air to the defibrated material M4 generated by suction, a second suction unit 7 that sucks and collects the defibrated material M4, a motor 33, and a detection unit 34 that detects the mixing amount of foreign matter. The first ejection unit 4 and the first suction unit 5 constitute a separation unit 10. Further, the rotating member 3, the second ejection unit 6, and the second suction unit 7 constitute a collection unit that collects the defibrated material M4 that is a material remaining on a first surface 311.

As shown in FIG. 3, the rotating member 3 has the mesh 31 that has a circular shape in plan view, and a support member 32 that supports the mesh 31.

The mesh 31 has the first surface 311 and a second surface 312 in a front and back relationship. In the present embodiment, the first surface 311 is an upper surface facing vertically upward, and the second surface 312 is a lower surface facing vertically downward.

The mesh 31 can be, for example, a linear body knitted in a net shape, or a disc-shaped member provided with a plurality of through holes. Of the fibers of the defibrated material M3 supplied onto the first surface 311 of the mesh 31, the fibers longer than the size of the opening of the mesh 31 remain on the mesh 31, that is, are deposited on the mesh 31, and the fibers shorter than the size of the opening of the mesh 31 or minute foreign matters such as coloring materials pass through the mesh 31. Then, by setting the opening of the mesh 31 to a desired size, for example, fibers having a length suitable for sheet manufacturing can be selectively left.

The support member 32 has a function of supporting the mesh 31 to maintain the flat shape of the mesh 31. In the present embodiment, the support member 32 supports the mesh 31 from the first surface 311 side of the mesh 31. At least a part of the mesh 31 and the support member 32 is fixed, and when the support member 32 is rotated by the operation of the motor 33, the mesh 31 is rotated together with the support member.

As shown in FIG. 4, the support member 32 includes a ring-shaped frame body 321 that supports the edge of the mesh 31, a central support portion 322 that supports the center portion of the mesh 31, and a plurality of rod-like connecting portions 323 that connect the frame body 321 and the central support portion 322 to each other.

In the present embodiment, the connecting portion 323 has a straight bar shape in which the cross-sectional shape is a quadrangular prism shape. In other words, the connecting portion 323 is a long member extending across the mesh 31 from the center portion to the outer peripheral portion. Further, in the present embodiment, four connecting portions 323 are provided radially, that is, at equal intervals along the circumferential direction of the mesh 31. The shape of the connecting portion 323 is not limited to the above-described configuration, for example, any shape such as a round bar shape may be used.

Such a rotating member 3 is coupled to the motor 33 that is a drive unit, and can rotate around a central axis O by the operation of the motor 33. The motor 33 is configured so that the rotation speed is variable depending on the energization condition, and the operation of the motor is controlled by the control unit 28. In the present embodiment, the rotating member 3 rotates in the arrow direction in FIG. 4, that is, in the clockwise direction when viewed from the first surface 311 side.

As described above, the mesh 31 has a circular shape in plan view and rotates around the central axis O of the circular shape. Thereby, the movement route of the defibrated material M4 can be made only on the first surface 311 of the mesh 31. Accordingly, it contributes to the downsizing of the rotating member 3 and consequently the downsizing of the separation device 1.

The first ejection unit 4 is installed on the first surface 311 side of the mesh 31. In the present embodiment, as shown in FIG. 1, the first ejection unit 4 is installed on the right side of the central axis O of the mesh 31 when viewed from the −y axis side toward the +y axis direction. The first ejection unit 4 is coupled to the downstream end of the pipe 242 and has a first ejection port 41 at a position facing the first surface 311 of the mesh 31. With the air flow generated by the blower 261, the first ejection unit 4 ejects the defibrated material M3 together with the air flowed through the first ejection port 41 toward the mesh 31 from above, that is, toward the first surface 311 from the first surface 311 side. Thereby, the defibrated material M3 can be supplied and deposited on the first surface 311 of the mesh 31.

The first ejection port 41 is installed away from the first surface 311 of the mesh 31. Thereby, the defibrated material M4 deposited on the first surface 311 of the mesh 31 can move as the mesh 31 rotates.

The first ejection port 41 has a shape where an opening surface thereof extends along the circumferential direction of the mesh 31. That is, the first ejection port 41 has a shape having a circular arc 411 located on the center side of the mesh 31, a circular arc 412 closer to the outer peripheral side of the circular arc 411, and a line segment 413 and a line segment 414 which couple the ends of the circular arcs to each other, in plan view of the opening surface of the first ejection port 41. The circular arc 411 and the circular arc 412 are provided in the circumferential direction of the mesh 31, and the circular arc 412 is longer than the circular arc 411. Further, the line segment 413 and the line segment 414 are arranged in this order from the front in the rotation direction of the mesh 31, and are provided in the radial direction of the mesh 31.

By supplying the defibrated material M3 from the first ejection port 41 having such a shape onto the first surface 311 of the mesh 31, the defibrated material M3 can be supplied and deposited in the rotation direction of the mesh 31.

The detection unit 34 detects the mixing amount of foreign matter in the defibrated material M4. As the detection unit 34, for example, a transmissive or reflective optical sensor can be used. In the present embodiment, the detection unit 34 is located on the first surface 311 side of the mesh 31 and in front of the first ejection unit 4 in the rotation direction of the mesh 31. The detection unit 34 is electrically coupled to the control unit 28, and information on the mixing amount of foreign matter detected by the detection unit 34 is converted into an electrical signal according to the detected light quantity and wavelength information and the electrical signal is transmitted to the control unit 28. The information can be used to adjust various separation conditions, for example.

Further, since the detection unit 34 is an optical sensor that optically detects whiteness of the defibrated material M3 or the defibrated material M4 that is the material supplied onto the first surface 311, based on the detected whiteness, the separation capability can be adjusted as will be described later, and the whiteness of the sheet S can be adjusted or increased.

The first suction unit 5 is provided on the second surface 312 side of the mesh 31 and on the opposite side of the first ejection unit 4 via the mesh 31. The first suction unit 5 has a first suction port 51, and is installed at a position where the first suction port 51 overlaps the first ejection port 41 when viewed from the direction of the central axis O of the mesh 31. The first suction unit 5 is coupled to the blower 262 via a pipe 245, and air can be sucked from the first suction port 51 by the operation of the blower 262. Further, the collection unit 27 composed of, for example, a filter is provided upstream of the pipe 245 from the blower 262. Thereby, the fiber or the foreign matter sucked by the first suction unit 5 can be captured and collected.

The first suction port 51 is installed away from the second surface 312 of the mesh 31. Thereby, it is possible to prevent the suction force of the first suction unit 5 from inhibiting the rotation of the mesh 31, which contributes to the smooth rotation of the mesh 31.

The first suction port 51 has a shape where an opening surface thereof extends along the circumferential direction of the mesh 31. That is, the first suction port 51 has a shape having a circular arc 511 located on the center side of the mesh 31, a circular arc 512 closer to the outer peripheral side than the circular arc 511, and a line segment 513 and a line segment 514 which couple the ends of the circular arcs to each other, in plan view of the opening surface of the first suction port 51. The circular arc 511 and the circular arc 512 are provided in the circumferential direction of the mesh 31, and the circular arc 512 is longer than the circular arc 511. Further, the line segment 513 and the line segment 514 are arranged in this order from the front in the rotation direction of the mesh 31, and are provided in the radial direction of the mesh 31.

In other words, the first suction port 51 which is a suction port has a portion where an opening width increases from the center portion of the mesh toward the outer peripheral side thereof. The defibrated material M3 or the defibrated material M4 on the mesh 31 moves at a higher movement speed in the circumferential direction of the mesh 31 as it goes to the outer peripheral side of the mesh 31. However, with the above configuration, the defibrated material M3 or the defibrated material M4 can be sufficiently sucked even on the outer peripheral side. Note that, the opening width in this case refers to the length in the direction along the circular arc 511 or the circular arc 512.

By supplying the defibrated material M3 from the first suction port 51 having such a shape onto the first surface 311 of the mesh 31, the defibrated material M3 deposited in the rotation direction of the mesh 31 can be sucked via the mesh 31. Therefore, suction can be performed according to the shape of the deposit of the defibrated material M3 deposited on the mesh 31, and the removal of foreign matter and the removal of short fibers in the defibrated material M3 can be performed uniformly.

The second ejection unit 6 is installed on the second surface 312 side of the mesh 31 and at a position different from the first suction unit 5, that is, in front of the first suction unit 5 in the rotation direction of the mesh 31. In the present embodiment, as shown in FIG. 1, the second ejection unit 6 is installed on the left side of the central axis O of the mesh 31 when viewed from the +y axis side. The second ejection unit 6 has a second ejection port 61 at a position facing the second surface 312 of the mesh 31. The second ejection unit 6 is coupled to the blower 263 via a pipe 243, and an air flow can be generated by the operation of the blower 263 and the air can be ejected from the second ejection port 61. Further, the second ejection port 61 ejects the air from the second surface 312 side of the mesh 31 toward the defibrated material M4 on the first surface 311 via the mesh 31. Thereby, the defibrated material M4 on the mesh 31 can be peeled from the first surface 311 of the mesh 31. Accordingly, collection of the defibrated material M4 can be effectively performed by suction by the second suction unit 7 which will be described later.

The second ejection port 61 is installed away from the second surface 312 of the mesh 31. Thereby, it is possible to prevent the second ejection unit 6 from coming into contact with the support member 32, for example.

The second ejection port 61 has a shape where an opening surface thereof curves along the circumferential direction of the mesh 31. That is, the second ejection port 61 has a shape having a circular arc 611 located on the center side of the mesh 31, a circular arc 612 closer to the outer peripheral side than the circular arc 611, and a line segment 613 and a line segment 614 which couple the ends of the circular arcs to each other, in plan view of the opening surface of the second ejection port. The circular arc 611 and the circular arc 612 are provided in the circumferential direction of the mesh 31, and the circular arc 612 is longer than the circular arc 611. Further, the line segment 613 and the line segment 614 are arranged in this order from the front in the rotation direction of the mesh 31, and are provided in the radial direction of the mesh 31.

By ejecting the air from the second ejection port 61 having such a shape toward the defibrated material M4 on the mesh 31, the defibrated material M4 can be peeled and separated from the mesh 31 in the rotation direction of the mesh 31.

The second suction unit 7 is installed on the first surface 311 side of the mesh 31 and at a position different from the first ejection unit 4, that is, in front of the first ejection unit 4 in the rotation direction of the mesh 31. The second suction unit 7 has a second suction port 71 at a position facing the first surface 311 of the mesh 31, and is installed at a position where the second suction port 71 overlaps the second ejection port 61 when viewed from the direction of the central axis O of the mesh 31. The second suction unit 7 is coupled to the downstream end of the pipe 172 of the mixing unit 17. Further, the air flow is generated by the operation of the blower 173 provided in the middle of the pipe 172, and suction can be performed from the second suction port 71. Thereby, the defibrated material M4 peeled off from the mesh 31 by the second ejection unit 6 can be sucked and collected, and the defibrated material M4 can be sent out to the downstream, that is, the mixing unit 17.

The second suction port 71 is installed away from the first surface 311 of the mesh 31. Thereby, it is possible to prevent the suction force of the second suction unit 7 from inhibiting the rotation of the mesh 31, which contributes to the smooth rotation of the mesh 31.

The second suction port 71 has a shape where an opening surface thereof curves along the circumferential direction of the mesh 31. That is, the second suction port 71 has a shape having a circular arc 711 located on the center side of the mesh 31, a circular arc 712 closer to the outer peripheral side than the circular arc 711, and a line segment 713 and a line segment 714 which couple the ends of the circular arcs to each other, in plan view of the opening surface of the second suction port 71. The circular arc 711 and the circular arc 712 are provided in the circumferential direction of the mesh 31, and the circular arc 712 is longer than the circular arc 711. Further, the line segment 713 and the line segment 714 are arranged in this order from the front in the rotation direction of the mesh 31, and are provided in the radial direction of the mesh 31.

By sucking the defibrated material M4 on the mesh 31 from the second suction port 71 having such a shape, the defibrated material M4 can be collected in the rotation direction of the mesh 31.

In this way, the second suction unit 7 functions as a collection suction unit that sucks and collects the defibrated material M4 that is a material deposited on the first surface 311 of the mesh 31. The collection by suction is performed, so that the defibrated material M4 can be collected without contact, and damage to the defibrated material M4 can be reduced.

By such a separation device 1, the defibrated material M3 becomes the defibrated material M4 which contains a fiber equal to or longer than a desired length and from which foreign matter is removed, and can be transported downstream to manufacture the sheet S with high quality.

Further, a deviation angle between the center of the first ejection port 41 and the center of the second suction port 71 and a deviation angle between the center of the first suction port 51 and the center of the second suction port 71 are preferably 90° or more and 270° or less, and more preferably 135° or more and 225° or less. As a result, the opening areas of the first ejection port 41, the first suction port 51, the second ejection port 61, and the second suction port 71 can be sufficiently secured, and even when the temperature of the defibrated material M3 ejected from the first ejection port 41 is relatively high, it is possible to sufficiently dissipate heat until the defibrated material is collected at the second suction port 71. In particular, by increasing the opening area of the first suction port 51, heat of the air flow or material passing through the first ejection port 41 can be sucked by the first suction unit 5.

Further, the thickness of the connecting portion 323, that is, the width of the mesh 31 in plan view is not particularly limited, but is preferably 1 mm or more and 20 mm or less, and more preferably 2 mm or more and 15 mm or less. Thereby, in a state where the first ejection port 41, the first suction port 51, the second ejection port 61, or the second suction port 71 overlaps the connecting portion 323 in plan view of the mesh 31, inhibition of ejection or suction can be effectively suppressed.

For the same reason, a ratio S1'/S1 between a maximum area S1' of the portion where the first ejection port 41 and the connecting portion 323 overlap in plan view of the mesh 31 and an opening area S1 of the first ejection port 41 is preferably 0.01 or more and 0.99 or less, and more preferably 0.01 or more and 0.50 or less.

Further, for the same reason, a ratio S2'/S2 between a maximum area S2' of the portion where the first suction port 51 and the connecting portion 323 overlap in plan view of the mesh 31 and an opening area S2 of the first suction port 51 is preferably 0.01 or more and 0.99 or less, and more preferably 0.01 or more and 0.50 or less.

For the same reason, a ratio S3'/S3 between a maximum area S3' of the portion where the second ejection port 61 and the connecting portion 323 overlap in plan view of the mesh 31 and an opening area S3 of the second ejection port 61 is preferably 0.01 or more and 0.99 or less, and more preferably 0.01 or more and 0.50 or less.

For the same reason, a ratio S4'/S4 between a maximum area S4' of the portion where the second suction port 71 and the connecting portion 323 overlap in plan view of the mesh 31 and an opening area S4 of the second suction port 71 is preferably 0.01 or more and 0.99 or less, and more preferably 0.01 or more and 0.50 or less.

The control unit 28 has a central processing unit (CPU) 281 and a storage unit 282. For example, the CPU 281 can make various determinations and various commands.

The storage unit 282 stores various programs, such as a program related to separation or a program for manufacturing the sheet S.

The control unit 28 may be built in the sheet manufacturing apparatus 100 or may be provided in an external device such as an external computer. In some cases, the external device communicates with the sheet manufacturing apparatus 100 via a cable or the like, or wirelessly communicates therewith. For example, a network such as the Internet may be connected to the external device via the sheet manufacturing apparatus 100.

Further, for example, the CPU 281 and the storage unit 282 may be integrated as a single unit, the CPU 281 may be built in the sheet manufacturing apparatus 100 and the storage unit 282 may be provided in an external device such as an external computer, or the storage unit 282 may be built in the sheet manufacturing apparatus 100 and the CPU 281 may be provided in an external device such as an external computer.

The control unit 28 has an input terminal 283 as an input unit to which a detection result detected by the detection unit 34, that is, information on foreign matter contained in the defibrated material M4 is input. In the present embodiment, the detection unit 34 is coupled to the input terminal 283, and information on the foreign matter detected by the detection unit 34 is input to the control unit 28 via the input terminal 283.

Note that, in the present embodiment, the information on the foreign matter is the amount of the foreign matter, that is, the remaining amount, as will be described later. However, the present disclosure is not limited thereto, and information such as the color, type, or presence or absence of foreign matter may be used.

As described above, the detection unit 34 detects the presence or absence of foreign matter in the defibrated material M4 or the amount of foreign matter in the defibrated material M4, more specifically whiteness. The control unit 28 can operate the separation device 1 under appropriate separation conditions according to the whiteness by controlling each unit to adjust the separation conditions as described below, that is, the removal capability of foreign matter, based on the whiteness. The separation conditions are at least one of [1] a rotation speed of the mesh 31, [2] a suction force of the first suction unit 5, or [3] an ejection amount of the first ejection unit 4, that is, a supply amount of the defibrated material M3. The control operations will be described below, and the separation conditions [1] to [3] will be described separately for each case. Needless to say, the adjustment may be performed by combining two or more of the separation conditions [1] to [3].

First, the separation condition [1], that is, the control operation for adjusting the rotation speed of the mesh 31 will be described based on the flowchart shown in FIG. 5.

As shown in step S101, first, each unit of the sheet manufacturing apparatus 100 is operated to start sheet manufacturing. Before the defibrated material M3 is supplied from the first ejection unit 4, in the separation device 1, the mesh 31 is rotated and the first ejection unit 4, the first suction unit 5, the second ejection unit 6, and the second suction unit 7 are operated. Accordingly, a state in which the air is ejected or sucked through the openings of the above units is created.

When the defibrated material M3 is supplied onto the mesh 31 and the removal of foreign matter is started, the detection unit 34 detects the whiteness of the defibrated material M4 in step S102.

In step S103, it is determined whether or not the detected whiteness is lower than a reference value. The reference value is a value stored in advance in the storage unit 282 and can be set as appropriate by the user in advance.

When the whiteness is lower than the reference value in step S103, it is considered that the removal of the foreign matter is insufficient, and in step S104, the energization condition to the motor 33 is changed to adjust, that is, increase the rotation speed of the mesh 31. Thereby, the thickness of the defibrated material M3 deposited on the first surface 311 of the mesh 31 is reduced, and the foreign matter can be more effectively removed. Therefore, even when the defibrated material M3 has a relatively large amount of foreign matter, a sufficient removal capability can be implemented, and the defibrated material M4 having sufficiently high whiteness can be obtained. As a result, the whiteness of the sheet S can be increased, that is, the quality of the sheet S can be increased.

Note that, the rotation speed of the mesh 31 can be adjusted based on a calibration curve or a table indicating the relationship between the energization condition to the motor 33 and the whiteness, which is stored in advance in the storage unit 282.

In step S105, it is determined whether or not the program related to sheet manufacturing is completed. In step S105, when it is determined that the program is not completed, the process returns to step S102, and the subsequent steps are sequentially repeated.

As described above, the separation device 1 has the motor 33 that is a drive unit that moves, that is, rotates the mesh 31, and the control unit 28 controls the operation of the motor 33 that is the drive unit to adjust the movement speed of the mesh 31, that is, the rotation speed of the mesh 31 in the present embodiment. Thereby, even when the defibrated material M3 has a relatively large amount of foreign matter, a sufficient removal capability can be implemented, and the defibrated material M4 having sufficiently high whiteness can be obtained. As a result, the whiteness of the sheet S can be increased, that is, the quality of the sheet S can be increased.

Next, the separation condition [2], that is, the control operation for adjusting the suction force of the first suction unit 5 will be described with reference to the flowchart shown in FIG. 6. However, since the separation condition [2] is substantially the same as the separation condition [1] except that step S104 in the control operation of the separation condition [1] is changed to step S204 in the control operation of the separation condition [2], steps S103 and S204 will be described, and description of other steps will not be repeated.

When the whiteness is lower than the reference value in step S103, it is considered that the removal of the foreign matter is insufficient, and in step S204, the energization condition to the blower 262 is changed to increase the suction force, that is, the flow rate of the air sucked by the first suction unit 5. Note that, the suction force of the first suction unit 5 can be adjusted based on a calibration curve or a table indicating the relationship between the energization condition to the blower 262 and the whiteness, which is stored in advance in the storage unit 282.

As described above, the separation device 1 has, on the second surface 312 side of the mesh 31, the first suction unit 5 as the suction unit that sucks the defibrated material M3 as the material from the first surface 311 side of the mesh 31 toward the second surface 312 side of the mesh 31, and the control unit 28 controls the operation of the first suction unit 5 to adjust the suction force of the first suction unit 5. Thereby, even when the defibrated material M3 has a relatively large amount of foreign matter, a sufficient removal capability can be implemented, and the defibrated material M4 having sufficiently high whiteness can be obtained. As a result, the whiteness of the sheet S can be increased, that is, the quality of the sheet S can be increased. Further, such a configuration has an advantage that the transport speed of the defibrated material M4 can be maintained, and is advantageous in sheet manufacturing that requires speed.

Next, the separation condition [3], that is, the control operation for adjusting the ejection amount of the first ejection unit 4 will be described with reference to the flowchart shown in FIG. 7. However, since the separation condition [3] is substantially the same as the separation condition [1] except that step S104 in the control operation of the separation condition [1] is changed to step S304 in the control operation of the separation condition [3], steps S103 and S304 will be described, and description of other steps will not be repeated.

When the whiteness is lower than the reference value in step S103, it is considered that the removal of the foreign matter is insufficient, and in step S304, the energization condition to the blower 261 is changed to reduce the ejection amount of the first ejection unit 4, that is, the supply amount of the defibrated material M3 in the first ejection unit 4. Note that, the ejection amount of the first ejection unit 4 can be adjusted based on a calibration curve or a table indicating the relationship between the energization condition to the blower 261 and the whiteness, which is stored in advance in the storage unit 282.

As described above, the separation device 1 has, on the first surface 311 side of the mesh 31, the first ejection unit 4 as the supply unit that supplies the defibrated material M3 as the material onto the first surface 311 of the mesh 31, and the control unit 28 controls the operation of the first ejection unit 4 to adjust the supply amount of the defibrated material M3. Thereby, even when the defibrated material M3 has a relatively large amount of foreign matter, the foreign matter of the defibrated material M3 can be satisfactorily sucked in the whole in the thickness direction thereof by reducing the amount deposited on the mesh 31, that is, reducing the thickness of the defibrated material M3 on the mesh 31. That is, a sufficient removal capability can be implemented. Therefore, the defibrated material M4 having a sufficiently high whiteness can be obtained. As a result, the whiteness of the sheet S can be increased, that is, the quality of the sheet S can be increased. Further, by combining the control of the separation conditions [1], [2], and [3] with a range of the whiteness set in the storage unit 282, the whiteness can be adjusted to a desired level in addition to increasing the whiteness.

As described above, the separation device 1 according to the present disclosure includes the mesh 31 that has the first surface 311 and the second surface 312 in a front and back relationship, the separation unit 10 that has the first ejection unit 4 having the first ejection port 41 for depositing a material containing a fiber on the first surface 311, and the first suction unit 5 having the first suction port 51 for sucking from the first surface 311 toward the second surface 312 so that at least a part thereof overlaps the first ejection port 41 in plan view, the second suction unit 7 provided at a position different from the first ejection port 41 in plan view and having the second suction port 71 for sucking from the second surface 312 toward the first surface 311, the detection unit 34 that detects information on foreign matter contained in the material ejected from the first ejection port 41, the input terminal 283 as an input unit that inputs a detection result of the detection unit 34, and the control unit 28 that controls the separation condition in the separation unit 10 based on the information input to the input terminal 283.

With such a configuration, the separation condition, that is, the separation capacity can be adjusted according to the amount of foreign matter. Therefore, for example, even when the defibrated material M3 has a relatively large amount of foreign matter, the defibrated material M4 from which the foreign matter is satisfactorily removed can be obtained by performing separation while increasing the removal capability. By manufacturing the sheet S using the defibrated material M4, the whiteness of the sheet S is adjusted, thereby obtaining a high-quality sheet S.

Note that, in the present embodiment, the information on the foreign matter detected by the detection unit 34 is input to the input terminal 283, but the present disclosure is not limited thereto. For example, the information may be input from an operation unit such as a touch panel. Specifically, for example, by inputting the whiteness of the sheet S manufactured by the operator or a range of the whiteness on the touch panel, the information may be input to the control unit 28 via the input terminal 283.

In the embodiment, the detection unit 34 is provided in front of the first ejection unit 4 in the rotation direction of the mesh 31, and detects the presence or absence of foreign matter in the defibrated material M4 or the amount of foreign matter in the defibrated material M4, but the present disclosure is not limited thereto. For example, the detection unit may detect the presence or absence of foreign matter in the defibrated material M4 before foreign matter is removed, such as the defibrated material M3 or the raw material M1 or the amount of foreign matter in the defibrated material M4. In this case, the detection unit 34 may be installed in, for example, the first ejection unit 4, a site upstream of the first ejection unit 4, or a site where the ejected defibrated material M3 can be detected in the air.

Further, the operating conditions of the second ejection unit 6 and the second suction unit 7, that is, the collection conditions thereof may be controlled to be adjusted in accordance with the adjustment of the above separation conditions.

Hereinbefore, the separation device according to the present disclosure has been described with reference to the illustrated embodiment, but the present disclosure is not limited thereto and each unit constituting the separation device can be replaced with any unit that can implement the same function. Further, any components may be added.

The separation device of the present disclosure may be a combination of any two or more configurations or features of the above embodiment.

Note that, in the above embodiment, the mesh has a circular shape in plan view and rotates around the central axis, but the present disclosure is not limited thereto. For example, the mesh includes an endless belt, and may be configured to be wound around a plurality of rollers to rotate around the rollers in a circular manner.

In the description of the above embodiment, the first ejection port, the first suction port, the second ejection port, and the second suction port each have a curved shape surrounded by two circular arcs and two straight lines, but the present disclosure is not limited thereto. For example, any shape such as a rectangle, a polygon, or a circle may be used.

Further, the first ejection port, the first suction port, the second ejection port, and the second suction port may have a plurality of openings. In this case, it is preferable that the number of openings increases as going to the outer peripheral side of the mesh.

The shapes of the first ejection port, the first suction port, the second ejection port, and the second suction port are not limited to the illustrated configuration, and any shape may be used. However, when the opening is divided by a circular arc passing through the midpoint of the opening surface in the radial direction of the mesh, the outer peripheral portion preferably has a larger area than the inner peripheral portion. The circular arc referred to here is a curvature along the outer edge of the mesh.

What is claimed is:

1. A separation device comprising:
   a mesh that has a first surface and a second surface in a front and back relationship;
   a separation unit that has
      a first ejection unit having a first ejection port for depositing a defibrated material containing pieces of fibers on the first surface, and
      a first suction unit having a first suction port for sucking from the first surface toward the second surface so that at least a part thereof overlaps the first ejection port in plan view;
   a second suction unit provided at a position different from the first ejection port in plan view and having a second suction port for sucking from the second surface toward the first surface;
   a detection unit disposed between the first ejection unit and the second suction unit to detect information on foreign matter contained in the defibrated material ejected from the first ejection port and deposited on the mesh before being subjected to suction by the second suction unit;
   an input unit that inputs a detection result of the detection unit; and
   a control unit that controls a separation condition in the separation unit based on the information input to the input unit.

2. The separation device according to claim 1, wherein the separation unit has a drive unit that moves the mesh, and
   the control unit controls an operation of the drive unit to adjust a movement speed of the mesh.

3. The separation device according to claim 1, wherein the control unit controls an operation of the first suction unit to adjust a suction force of the first suction unit.

4. The separation device according to claim 1, wherein the control unit controls an operation of the first ejection unit to adjust a supply amount of the defibrated material.

5. The separation device according to claim 1, wherein the detection unit has an optical sensor that optically detects whiteness of the defibrated material supplied onto the first surface.

* * * * *